(12) United States Patent
Holman et al.

(10) Patent No.: US 12,163,386 B2
(45) Date of Patent: Dec. 10, 2024

(54) DRILLING FLUID CONDITIONING SYSTEMS AND METHODS

(71) Applicant: National Oilwell Varco, L.P., Houston, TX (US)

(72) Inventors: Ian M. Holman, Pearland, TX (US); Eric Landon Scott, Conroe, TX (US); Mark J. Lapeyrouse, Missouri City, TX (US); Bradford R. Wood, Spring, TX (US)

(73) Assignee: National Oilwell Varco, L.P., Houston, TX (US)

( * ) Notice: Subject to any disclaimer, the term of this patent is extended or adjusted under 35 U.S.C. 154(b) by 44 days.

(21) Appl. No.: 17/950,294

(22) Filed: Sep. 22, 2022

(65) Prior Publication Data

US 2023/0085777 A1    Mar. 23, 2023

Related U.S. Application Data

(60) Provisional application No. 63/247,145, filed on Sep. 22, 2021.

(51) Int. Cl.
*E21B 21/06* (2006.01)
*E21B 36/00* (2006.01)

(52) U.S. Cl.
CPC .......... *E21B 21/065* (2013.01); *E21B 36/001* (2013.01)

(58) Field of Classification Search
None
See application file for complete search history.

(56) References Cited

U.S. PATENT DOCUMENTS

| | | | | |
|---|---|---|---|---|
| 2,359,923 | A | * 10/1944 | Lawless | ................. E21B 21/06 366/147 |
| 2006/0131247 | A1 | * 6/2006 | Browne | .................... B03C 5/00 210/243 |
| 2014/0202664 | A1 | 7/2014 | Schexnaider et al. | |
| 2015/0330165 | A1 | * 11/2015 | Thiessen | ............... E21B 21/065 165/45 |

FOREIGN PATENT DOCUMENTS

KR    20150084188 A    7/2015

OTHER PUBLICATIONS

International Search Report and Written Opinion dated Dec. 8, 2022, for Application No. PCT/US2022/044335.

* cited by examiner

*Primary Examiner* — Charles R Nold
(74) *Attorney, Agent, or Firm* — Conley Rose, P.C.

(57) ABSTRACT

A drilling fluid conditioning system for a well system includes a return conduit configured to receive drilling fluid recirculated from a wellbore of the well system, a drilling fluid pre-chilling system in fluid communication with and downstream from the return conduit, wherein the drilling fluid pre-chilling system includes a cooler configured to transfer heat from the drilling fluid to a heat sink, and a solids control system in fluid communication with and downstream from the drilling fluid pre-chilling system, wherein the solids control system is configured to separate at least some solids from the drilling fluid.

23 Claims, 8 Drawing Sheets

DRILLING FLUID CONDITIONING SYSTEMS AND METHODS

CROSS-REFERENCE TO RELATED APPLICATIONS

The present application claims benefit of U.S. provisional patent application No. 63/247,145 filed Sep. 22, 2021, and entitled "Drilling Fluid Conditioning Systems and Methods", which is incorporated herein by reference in its entirety.

STATEMENT REGARDING FEDERALLY SPONSORED RESEARCH OR DEVELOPMENT

Not applicable.

BACKGROUND

Drilling systems may be utilized for drilling a wellbore through a subterranean earthen formation. In at least some applications, drilling systems include a drill bit coupled to an end of a tubular string conveyed through the wellbore, the drill bit configured to cut into the earthen formation and thereby extend the wellbore. Additionally, drilling fluid is typically pumped from the surface, through the tubular string, and into an annulus formed between the tubular string and a sidewall of the wellbore via one or more ports formed in the drill bit. The drilling fluid may be used too cool and/or power rotation of the drill bit. Additionally, the drilling fluid conveys formation cuttings from the wellbore to the surface as the drilling fluid is recirculated through the annulus to the surface. In some applications, the temperature of the drilling fluid may be significantly higher when returning to the surface than when pumped into the tubular string at the surface. Additionally, the surface pumps utilized for pumping the drilling fluid into the tubular string may be incapable of processing the formation cuttings entrained in the drilling fluid upon its recirculation to the surface. Some drilling systems may therefore condition the drilling fluid upon its return to the surface to remove formation cuttings and other entrained materials from the drilling fluid, and/or to reduce a temperature of the drilling fluid.

SUMMARY

An embodiment of a drilling fluid conditioning system for a well system comprises a return conduit configured to receive drilling fluid recirculated from a wellbore of the well system, a drilling fluid pre-chilling system in fluid communication with and downstream from the return conduit, wherein the drilling fluid pre-chilling system comprises a cooler configured to transfer heat from the drilling fluid to a heat sink, and a solids control system in fluid communication with and downstream from the drilling fluid pre-chilling system, wherein the solids control system is configured to separate at least some solids from the drilling fluid. In some embodiments, the cooler of the drilling fluid pre-chilling system comprises a pipe-in-pipe heat exchanger which comprises an inner pipe comprising a first fluid inlet configured to receive the drilling fluid and an outer pipe surrounding the inner pipe and configured to receive water from a water source. In some embodiments, the system comprises a drilling fluid chiller in fluid communication with and downstream from the solids control system, wherein the drilling fluid chiller is configured to further cool the drilling fluid, wherein the inner pipe of the pipe-in-pipe heat exchange comprises a second fluid inlet configured to receive the drilling fluid cooled by the drilling fluid chiller. In certain embodiments, at least one of a finned outer baffle extends helically through an annulus formed between the inner pipe and the outer pipe, and a finned inner baffle extends helically through a central passage of the inner pipe. In certain embodiments, the drilling fluid pre-chilling system comprises a solids separator in fluid communication with and upstream from the cooler, wherein the solids separator is configured to remove solids from the drilling fluid received by the drilling fluid pre-chilling system having a minimum size of 0.25 inches or greater. In some embodiments, the solids separator comprises an open air, mesh conveyor belt configured to convey solids captured by the solids separator to a solids receptacle. In some embodiments, the system comprises a jet pump configured to transport the drilling fluid from the solids separator to the cooler. In some embodiments, the solids separator comprises a Y-strainer comprising a screen configured to block the passage of the solids having a minimum size of 0.25 inches or greater. In certain embodiments, the cooler of the drilling fluid pre-chilling system comprises a heat exchanging tray having a lateral width that is greater than a vertical height of the heat exchanging tray. In certain embodiments, the cooler comprises an air blower configured to circulate air along a plurality of fins extending from the heat exchanging tray. In some embodiments, the cooler is configured to cool the drilling fluid to a temperature of at most 200 degrees Fahrenheit. In some embodiments, the drilling fluid received by the drilling fluid pre-chilling system comprises solids having a maximum diameter of 0.25 inches and greater.

An embodiment of a drilling fluid conditioning system for a well system comprises a return conduit configured to receive drilling fluid recirculated from a wellbore of the well system, and a drilling fluid pre-chilling system in fluid communication with and downstream from the return conduit, wherein the drilling fluid pre-chilling system comprises a cooler configured to transfer heat from the drilling fluid to a heat sink, the drilling fluid comprising solids having a maximum diameter of 0.25 inches and greater. In some embodiments, the cooler of the drilling fluid pre-chilling system comprises a pipe-in-pipe heat exchanger which comprises an inner pipe comprising a first fluid inlet configured to receive the drilling fluid and an outer pipe surrounding the inner pipe and configured to receive water from a water source. In some embodiments, the system comprises a drilling fluid chiller in fluid communication with and downstream from the drilling fluid pre-chilling system, wherein the drilling fluid chiller is configured to further cool the drilling fluid, wherein the inner pipe of the pipe-in-pipe heat exchange comprises a second fluid inlet configured to receive the drilling fluid cooled by the drilling fluid chiller. In certain embodiments, the drilling fluid pre-chilling system comprises a solids separator in fluid communication with and upstream from the cooler, wherein the solids separator is configured to remove solids from the drilling fluid received by the drilling fluid pre-chilling system having a minimum size of 0.25 inches or greater. In certain embodiments, the solids separator comprises an open air, mesh conveyor belt configured to convey solids captured by the solids separator to a solids receptacle. In some embodiments, the cooler of the drilling fluid pre-chilling system comprises a heat exchanging tray having a lateral width that is greater than a vertical height of the heat exchanging tray. In some embodiments, the cooler is configured to cool the drilling fluid to a temperature of at most 200 degrees Fahrenheit. In certain embodiments, the system comprises a solids control system in fluid communication with and downstream from the drilling fluid pre-chilling system, wherein the solids control system is configured to separate at least some solids from the drilling fluid.

An embodiment of a method for conditioning drilling fluid of a well system comprises (a) receiving by a return conduit of the well system drilling fluid recirculated from a wellbore of the well system, (b) flowing the drilling fluid from the return conduit to a drilling fluid pre-chilling system of the well system whereby a cooler of the drilling fluid pre-chilling system transfers heat from the drilling fluid to a heat sink, and (c) flowing the drilling fluid from the drilling fluid pre-chilling system to a solids control system of the well system whereby at least some solids entrained in the drilling fluid are separated from the drilling fluid by the solids control system. In some embodiments, the drilling fluid received by the drilling fluid pre-chilling system comprises solids having a maximum diameter of 0.25 inches and greater. In some embodiments, (b) comprises cooling the drilling fluid to a temperature of at most 200 degrees Fahrenheit.

BRIEF DESCRIPTION OF THE DRAWINGS

For a detailed description of exemplary embodiments of the disclosure, reference will now be made to the accompanying drawings in which.

DETAILED DESCRIPTION

Figure 1:
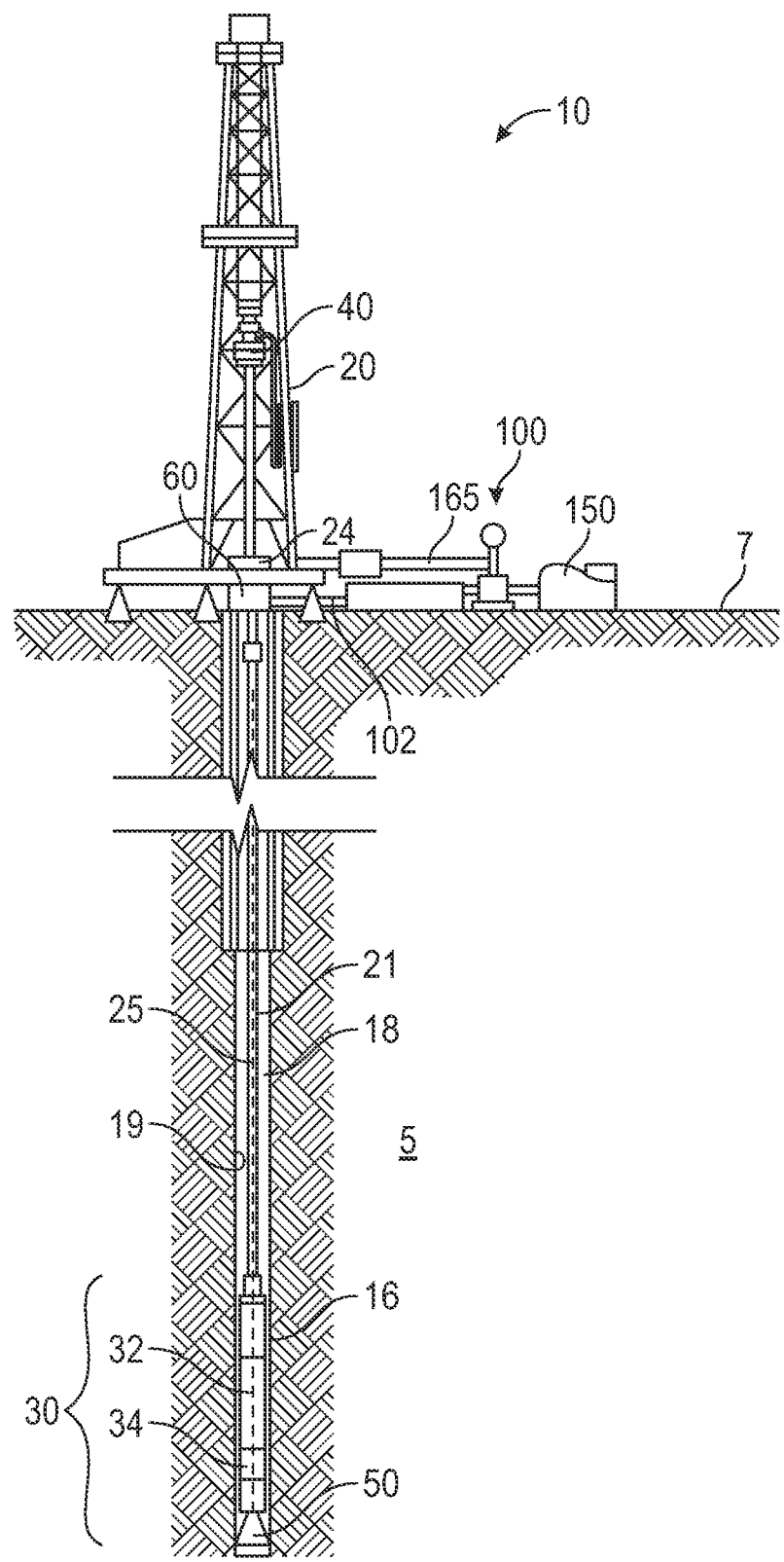
FIG. 1 is a schematic view of an embodiment of a well system.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation.

As described above, drilling fluid utilized in drilling fluid systems is often at an elevated temperature (due in at least at part to the elevated temperature of the wellbore) and includes foreign materials such as formation cuttings when the drilling fluid recirculates to the surface through the annulus formed between the tubular string of the drilling system and the sidewall of the wellbore. The foreign materials entrained in the drilling fluid may damage the surface pumps used to pump the drilling fluid into the tubular string. Additionally, the elevated temperature of the drilling fluid may inhibit the capacity of the drilling fluid to cool the drill bit and/or may damage or reduce the reliability of other components of the drilling system the hot drilling fluid comes into contact with, such as the surface pumps. Thus, the drilling fluid may be conditioned at the surface prior to being pumped into the drill string by the surface pumps.

For example, the drilling system may include solids control equipment designed to separate entrained solids from the drilling fluid before the drilling fluid is received by the surface pumps so that the solids do not damage the pumps during operation. For example, the drilling system may include a shale shaker including a vibrating sieve or wire mesh which permits the drilling fluid to pass therethrough while collecting solids (e.g., solids greater than 70 micrometers (microns) in diameter thereon. In addition to permitting the drilling fluid to be received by the surface pumps, by separating out the entrained solid particles, the solids control equipment also permits the drilling fluid to be received by a conventional drilling fluid cooling or mud chilling system without fouling or otherwise reducing the reliability of the mud chilling system. The conventional mud chilling system may cool the drilling fluid before it is received by the surface pumps to a temperature that will not damage the surface pumps (e.g., temperature sensitive elastomers of the surface pumps) and/or will permit the drilling fluid to effectively cool the drill bit. The conventional mud chilling system may include one or more heat exchangers which rely on ambient air and/or chilled water to cool the drilling fluid.

However, in some applications, the temperature of the drilling fluid recirculated to the surface may be especially elevated to a degree whereby the hot drilling fluid may damage or otherwise reduce the reliability of the solids control equipment itself. Additionally, the hot drilling fluid may be hazardous to personnel of the drilling system within the vicinity of the drilling fluid conditioning equipment. As an example, some geothermal wells utilized in geothermal developments may be at such a downhole temperature whereby drilling fluids recirculated from the geothermal well may be at temperatures at or above 250 degrees Fahrenheit (° F.). At such elevated temperatures the drilling fluid may damage the solids control equipment and/or other drilling fluid conditioning equipment. Additionally, drilling fluid at temperatures of 250° F. or greater may overwhelm the capacity of conventional mud chilling systems whereby the mud chilling system is incapable of reducing the temperature of the hot drilling fluid to a desired temperature that will not damage the surface pumps and/or inhibit the drilling fluid from cooling the drill bit of the drilling system.

Accordingly, embodiments disclosed herein include drilling fluid conditioning systems including a drilling fluid pre-chilling system located upstream from a solids control system of the conditioning system and which is configured to cool drilling fluid containing solids having a maximum size of 0.25 inches or greater to a temperature of at most 200° F. Particularly, embodiments of drilling fluid pre-chilling systems disclosed herein are configured so as to not become fouled or otherwise damaged by hot drilling fluids (e.g., having a temperature of 250° F. and greater) including solids of a relatively large size (e.g., 0.25 inches or greater in diameter). The drilling fluid pre-chilling systems disclosed herein may transfer heat from the drilling fluid to ambient air and/or water from a water source, or other cooling medium. For example, drilling fluid pre-chilling systems disclosed herein may include a cooler configured to transfer heat from the drilling fluid to a heat sink such as, for example, water supplied by a water-cooling system of the well system. Additionally, in some embodiments, the drilling fluid pre-chilling system may include a solids separator to separate out and/or capture solids having a relatively large size (e.g., 0.25 inches or greater) to prevent fouling or clogging of the cooler of the drilling fluid pre-chilling system. Accordingly, embodiments of drilling fluid pre-chilling systems disclosed herein may be utilized to cool especially hot drilling fluids (e.g., drilling fluids having a temperature of 250° F. and greater) whereby the drilling fluid will not pose a hazard to personnel of the well system and/or damage or otherwise interfere with the operation of other components of the drilling fluid conditioning system such as the solids control system thereof.

Referring to FIG. 1, an embodiment of a well or drilling system 10 is shown. Drilling system 10 is generally configured for drilling a wellbore 16 extending through an earthen formation 5 from a surface 7. In the embodiment of FIG. 1, drilling system 10 includes a drilling rig 20 disposed at the surface 7, a drillstring 21 extending downhole from rig 20 along a central or longitudinal axis 25, a bottomhole assembly (BHA) 30 coupled to the lower end of drillstring 21, and a drill bit 90 attached to the lower end of BHA 30. Drilling system 10 additionally includes a drilling fluid conditioning system 100 located at the surface 7 and including a surface or mud pump system 150 for pumping drilling fluid or mud through drillstring 21 via a kelly 40 coupled to an upper end of drillstring 21. Additionally, rig 20 includes a rotary system 24 for imparting torque to an upper end of drillstring 21 to thereby rotate drillstring 21 in wellbore 16. In this embodiment, rotary system 24 comprises a rotary table located at a rig floor of rig 20; however, in other embodiments, rotary system 24 may comprise other systems for imparting rotary motion to drillstring 21, such as a top drive which may also be used to provide pressurized drilling fluid to drillstring 21 in lieu of the kelly 40.

In some embodiments, BHA 30 may include a downhole mud motor 32 for converting the fluid pressure of the drilling fluid pumped downward through drillstring 21 by mud pump system 150 into rotational torque for driving the rotation of drill bit 50. The drill bit 50 may be connected to the downhole mud motor 32 via a bearing mandrel 34 positioned between the downhole mud motor 32 and drill bit 50. With force or weight applied to the drill bit 90, also referred to as weight-on-bit ("WOB"), the rotating drill bit 50 engages the earthen formation and proceeds to form wellbore 16 along a predetermined path toward a target zone. The drilling fluid or mud pumped down the drillstring 21 and through BHA 30 passes out of the face of drill bit 50 and back up the annulus 18 formed between drillstring 21 and the sidewall 19 of wellbore 16. The drilling fluid cools the drill bit 50, and flushes the cuttings away from the face of drill bit 50 and carries the cuttings to the surface 7 where the recirculated drilling fluid is received by the drilling fluid conditioning system 100. At the surface 7 the drilling fluid recirculated from wellbore 16 may be conditioned or treated (e.g., to remove drill cuttings or other debris from the drilling fluid, etc.) by the drilling fluid conditioning system 100 prior to being pumped back into drillstring 21 via surface pump system 150 and kelly 40.

In this exemplary embodiment, drilling system 10 includes a managed pressure drilling (MPD) system 60 located at the surface 7. The MPD system 60 pressure isolates the drilling fluid recirculated to the surface 7 from the surrounding environment. For example, MPD system 60 may comprise a rotating control device (RCD) which seals the wellbore 16 from the surrounding environment while permitting drillstring 21 to be rotated therethrough. In this arrangement, backpressure may be applied to the drilling fluid recirculated from the annulus 18 by MPD system 60 to control the fluid pressure within wellbore 16.

Figure 2:
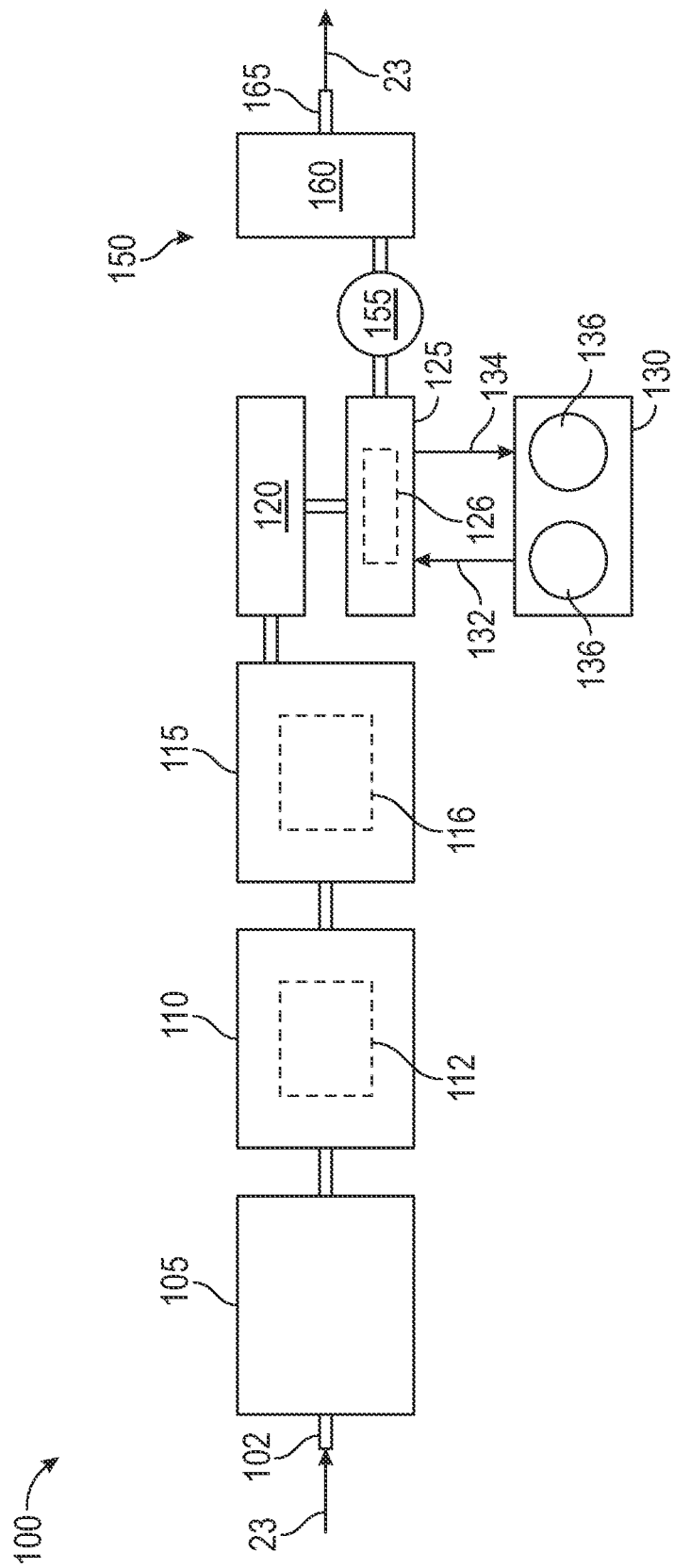
FIG. 2 is a schematic view of an embodiment of a drilling fluid conditioning system of the well system of FIG. 1.

Referring to FIGS. 1, 2, an additional view of the drilling fluid conditioning system 100 is provided in FIG. 2. In this exemplary embodiment, drilling fluid conditioning system 100 generally includes a return conduit 102, a drilling fluid or drilling fluid pre-chilling system 105, a solids control system 110, a degassing system 115, a suction tank 120, a mud chilling system 125, a water cooling system 130, the surface pump system 150, and a discharge conduit 165. The configuration of drilling fluid conditioning system 100 may vary depending upon the given application and thus, in other embodiments, drilling fluid conditioning system 100 may not include each of the components shown in FIGS. 1, 2, and/or may include additional components not shown in FIGS. 1, 2. In this exemplary embodiment, return conduit 102 receives the hot, recirculated drilling fluid (indicated schematically by arrow 23 in FIG. 2) from the MPD system 40 of drilling system 10. Thus, drilling fluid 23 is pressurized as it is received by drilling fluid conditioning system 100, and is at a pressure greater than ambient pressure. In other embodiments, drilling system 10 may not include MPD system 40, and thus the drilling fluid conveyed by return conduit 102 may be open to the atmosphere and at ambient, surface pressure.

In this exemplary embodiment, drilling fluid pre-chilling system 105 of drilling fluid conditioning system 100 receives the drilling fluid 23 via the return conduit 102. Generally, drilling fluid pre-chilling system 105 is configured to cool the drilling fluid 23 before the drilling fluid 23 is received by the solids control system 110 of drilling fluid conditioning system 100. Thus, drilling fluid pre-chilling system 105 is positioned upstream from solids control system 110 and the components of drilling fluid conditioning system 100 located downstream from solids control system 110 (e.g., degassing system 115, mud chilling system 125, surface pumps system 150, etc.). Hence, drilling fluid pre-chilling system 105 is referred to herein as a "pre-chilling" system in that system 105 is configured to chill or cool the drilling fluid 23 before any solids have been removed from the drilling fluid 23 by solids control system 110 or similar equipment. Additionally, while in this exemplary embodiment drilling fluid conditioning system 100 includes both drilling fluid pre-chilling system 105 and mud chilling system 125, in some embodiments, drilling fluid conditioning system 100 may include only drilling fluid pre-chilling system 105 and not mud chilling system 125.

In some embodiments, drilling fluid pre-chilling system 105 is configured to receive and cool drilling fluid 23 containing solids having a diameter of 0.25 inches or greater. In some embodiments, drilling fluid pre-chilling system 105 is configured to receive and cool drilling fluid 23 containing solids having a diameter of 0.50 inches or greater. In certain embodiments, drilling fluid pre-chilling system 105 is configured to receive and cool drilling fluid 23 at 250° F. or greater. In certain embodiments, drilling fluid pre-chilling system 105 is configured to receive and cool drilling fluid 23 at 300° F. or greater. In this exemplary embodiment, the drilling fluid pre-chilling system 105 is configured to reduce the temperature of the drilling fluid 23 to 200° F. or less; however, in other embodiments, the temperature of the drilling fluid 23 exiting drilling fluid prechilling system 105 may vary. In some embodiments, in addition to cooling the drilling fluid 23, drilling fluid pre-chilling system 105 is configured to remove at least some of the solids from drilling fluid 23 before the drilling fluid 23 is received by the solids control system 110.

Generally, drilling fluid pre-chilling system 105 is configured to cool the drilling fluid 23 by exchanging between the drilling fluid 23 and chilled water and/or the ambient air. For example, drilling fluid pre-chilling system 105 may exchange heat between drilling fluid 23 and chilled water provided by water cooling system 130. In some embodiments, drilling fluid pre-chilling system 105 may exchange heat between drilling fluid 23 and water collected from a local body of water such as a river or other source. The configuration of drilling fluid pre-chilling system 105 may vary, and some exemplary embodiments of drilling fluid pre-chilling system 105 are described further below.

In this exemplary embodiment, solids control system 110 is configured to remove at least some of the solids from drilling fluid 23 before drilling fluid 23 is received by the components of drilling fluid conditioning system 100 positioned downstream from solids control system 110, including the surface pump system 150. Particularly, solids control system 110 is configured to remove solids at and above a given size (e.g., diameter) from the drilling fluid 23. In some embodiments, solids control system 110 is configured to remove solids having a size of approximately between 70 microns and 100 microns or greater; however, in other embodiments, the minimum size of solids removed by solids control system 110 may vary. Additionally, in this embodiment, the solids control system 110 comprises one or more shale shakers 112 each comprising a vibrating wire screen configured to allow the drilling fluid 23 to pass therethrough while preventing the passage of solids having a particular minimum size (e.g., approximately between 70 microns and 100 microns in some embodiments). Solids control system 110 may have equipment in addition to the shale shakers 112. Additionally, in other embodiments, solids control system 110 may comprise mechanisms other than shale shakers 112 for separating out solids from the drilling fluid 23.

Degassing system 115 of drilling fluid conditioning system 100 is generally configured to remove entrained gasses from the drilling fluid 23. For example, as the drilling fluid 23 recirculates to the surface 7 through the annulus 18, the drilling fluid 23 may collect gasses from the subterranean formation 5 such as methane, hydrogen sulfide, carbon dioxide, etc., which are removed by degassing system 115 prior to the drilling fluid 23 being received by the surface pump system 150. Degassing system 115 comprises one or more degassers 116 which separate out the entrained gasses. The degassers 116 may expand the size of the gas bubbles entrained in the drilling fluid 23 (e.g., by pulling a vacuum on the drilling fluid 23) and/or degassers 116 may include one or more baffles configured to allow the gas bubbles to escape; however, the configuration of degassers 118 may vary depending on the given application. Additionally, degassing system 115 may include a mud gas separator (MGS) in lieu of or in addition to the degassers 118.

Mud chilling system 125 of drilling fluid conditioning system 100 is configured to further cool the drilling fluid 23 before it is supplied to the surface pump system 150. In this exemplary embodiment, mud chilling system 125 receives drilling fluid from a suction tank 120 downstream from the outlet of the degassing system 115. In some embodiments, drilling fluid conditioning system 100 may include a centrifuge or other solids control devices to remove smaller, finer particles from the drilling fluid 23 than that removed by the solids control system 110 described above.

Mud chilling system 125 exchanges heat between the drilling fluid 23 and the ambient air and/or chilled water. In this exemplary embodiment, mud chilling system 125 comprises one or more heat exchangers 126 with chilled water (indicated by arrow 132 in FIG. 2) received from water cooling system 130. The chilled water 132 is heated by the drilling fluid 23 and returned to the water cooling system 130 as heated water (indicated by arrow 134 in FIG. 2). Water cooling system 130 may comprise one or more cooling towers 136 in which heat from the heated water 134 is transferred to the surrounding atmosphere to thereby produce chilled water 132. Water cooling towers 136 may comprise closed circuit cooling towers (e.g., dry cooling towers, hybrid cooling towers, etc.) or open circuit cooling towers (e.g., wet cooling towers, etc.). It may be understood that the configuration of water cooling system 130 may vary based on the given application. In this exemplary embodiment, mud chilling system 125 outputs cooled drilling fluid 23 directly to the surface pump system 150. In other embodiments, mud chilling system 125 may output the cooled drilling fluid 23 to a mixing tank from which the drilling fluid 23 is supplied to the surface pump system 150.

In some embodiments, mud chilling system 125 may receive ambient water from a local body of water such as a river which may act as a heat sink for the heat transferred from drilling fluid 23 by mud chilling system 125. In still other embodiments, the heat exchangers 126 of mud chilling system 125 may comprise fin-fan style heat exchangers in which large fans blow ambient air across a plurality of small, finned-tubes which convey the drilling fluid 23 therethrough. Generally, the heat exchangers 126 of mud chilling system 125 will become fouled should the drilling fluid 23 contain solids having a diameter of 0.25 inches or greater.

However, this issue is avoided by the presence of solids control system 110 located upstream from mud chilling system 125.

In this exemplary embodiment, surface pump system 150 of drilling fluid conditioning system 100 comprises one or more centrifugal charge pumps 155 positioned upstream from one or more associated reciprocating pumps 160. Charge pumps 155 are positioned upstream from reciprocating pumps 160 to increase the pressure of drilling fluid 23 prior to entering reciprocating pumps 160. In this manner, charge pumps 155 may prevent cavitation from occurring within reciprocating pumps 160. In other embodiments, the configuration of surface pump system 150 may vary. For example, in some embodiments, surface pump system 150 may not include charge pumps 155. In this exemplary embodiment, the drilling fluid 23 discharged by the reciprocating pumps 160 of surface pump systems 150 flows through the discharge conduit 165 and returns to the drillstring 21 via kelly 40.

Figure 3:
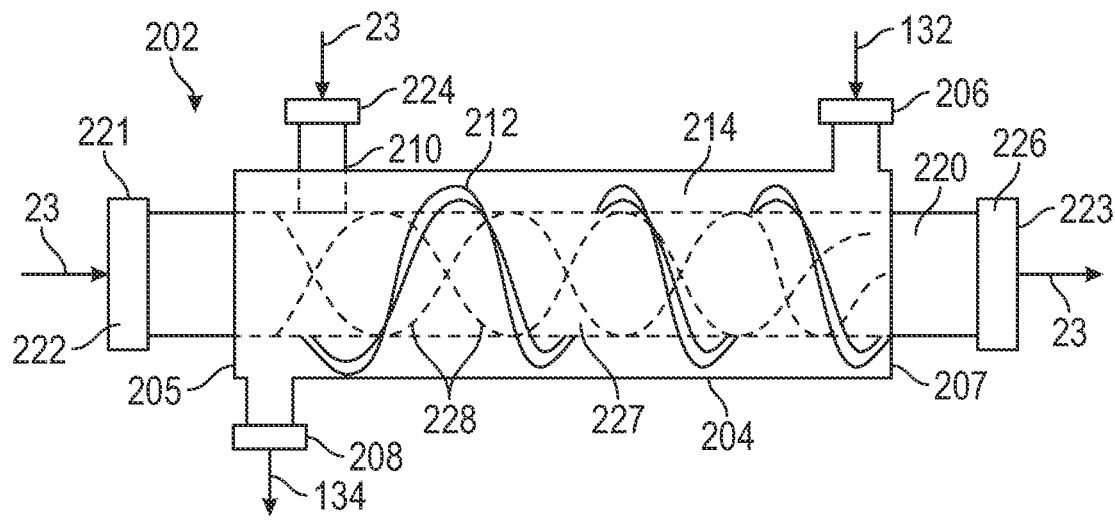
FIGS. 3, 4 are schematic views of an embodiment of a drilling fluid pre-chilling system of the drilling fluid conditioning system of FIG. 2.
Figure 4:
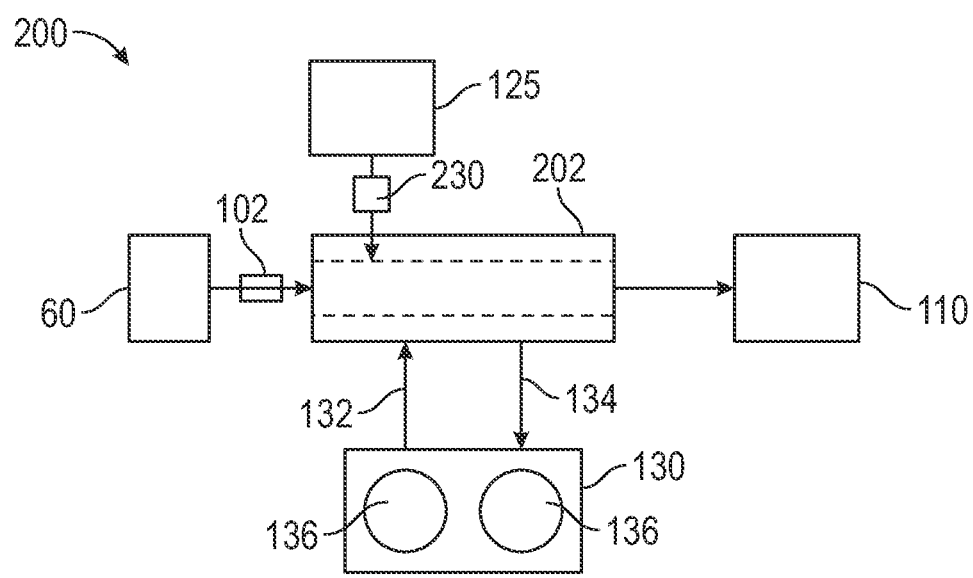

Referring now to FIGS. 3, 4, an embodiment of a drilling fluid pre-chilling system 200 of the drilling fluid conditioning system 100 shown in FIGS. 1, 2 is shown in FIGS. 3, 4. Drilling fluid pre-chilling system 200 is generally configured to cool hot drilling fluid 23 (e.g. at temperatures of or exceeding 250° F.) containing large solid particles (e.g., solids having a diameter of 0.25 inches or greater) to a temperature of at most 200° F. In some embodiments, drilling fluid pre-chilling system 200 may cool the drilling fluid 23 to temperatures of at most 150° F. However, the temperature of the drilling fluid 23 at the outlet of drilling fluid pre-chilling system 200 may vary based on the application, including the temperature of the drilling fluid 23 at the inlet of drilling fluid pre-chilling system 200. In this exemplary embodiment, drilling fluid pre-chilling system 200 generally includes a cooler or pipe-in-pipe heat exchanger 202 positioned between the MPD system 60 and the solids control system 110 configured to transfer heat from the drilling fluid 23 to a heat sink.

In this exemplary embodiment, pipe-in-pipe heat exchanger 202 comprises an outer tubular member or pipe 204 surrounding an inner tubular member or pipe 220. As shown particularly in FIG. 3, the outer pipe 204 comprises a longitudinal first end 205, a longitudinal second end 207 opposite the first end 205, a fluid inlet 206, a fluid outlet 208, and a sealed opening 210. In this exemplary embodiment, fluid inlet 206 receives chilled water 132 from the water cooling system 130 while fluid outlet 208 discharges heated water 134 which is returned to the water cooling system 130 for cooling. Thus, in this exemplary embodiment, chilled water 132 acts as a heat sink. Outer pipe 204 may also be referred to herein as a cooling or water jacket 204. Pipe-in-pipe heat exchanger 202 may receive chilled water 132 in parallel with the mud chilling system 125 of drilling fluid conditioning system whereby a single water cooling system 130 may supply both drilling fluid pre-chilling system 200 and mud chilling system 125 with chilled water 132. Thus, in this exemplary embodiment, drilling fluid pre-chilling system 200 may comprise a closed circuit cooling system. In other embodiments, fluid inlet 206 may receive ambient water from a local water source such as a local body of water while fluid outlet 208 may discharge heated water that is returned to the local water source which acts as a heat sink.

In this exemplary embodiment, the fluid inlet 206 and fluid outlet 208 are located at opposing ends 205, 207 of outer pipe 204, thereby forcing the water received by fluid inlet 206 to travel substantially the entire longitudinal length of outer pipe 204 before being discharged via fluid outlet 208. Additionally, fluid inlet 206 is positioned at the second end 207 of outer pipe 204 in this exemplary embodiment whereby the flow of water through outer pipe 204 is in the opposite or reverse direction of the flow of drilling fluid 23 through inner pipe 220 as will be discussed further herein. Further, in this exemplary embodiment, one or more finned outer baffles 212 extend helically through an annulus 214 formed radially between the inner pipe 220 and the outer pipe 204. Outer baffles 212 enhance the circulation (e.g., increase the residence time of the water within annulus 214 as it flows from fluid inlet 206 to fluid outlet 208) to thereby maximize the amount of heat transferred from the drilling fluid 23 circulating through inner pipe 220 to the water circulating through outer pipe 204.

In this exemplary embodiment, inner pipe 220 of pipe-in-pipe heat exchanger has a longitudinal first end 221, a longitudinal second end 223, a first or longitudinal fluid inlet 222, a second or radial fluid inlet 224, and a fluid outlet 226. In this exemplary embodiment, longitudinal fluid inlet 222 of inner pipe 220 receives hot drilling fluid 23 from the MPD system 60 via return conduit 102 and discharges cooled drilling fluid 23 to the solids control system 110. Thus, in this exemplary embodiment, the drilling fluid 23 received by inner pipe 220 is pressurized and sealed from the surrounding environment by MPD system 60. However, in other embodiments where drilling system 10 does not include MPD system 60, the drilling fluid 23 received by inner pipe 220 may be at atmospheric pressure.

The radial fluid inlet 224 extends through the sealed opening 210 of outer pipe 204 in this exemplary embodiment. In other embodiments radial fluid inlet 224 may be entirely external outer pipe 204. Radial fluid inlet 224 receives cooled drilling fluid 23 discharged by the mud chilling system 125 (e.g., drilling fluid 23 that otherwise would have been circulated to surface pumps system 150) and is mixed with the hot drilling fluid 23 received by longitudinal fluid inlet 222 within a central passage 227 of inner pipe 220, thereby providing additional cooling to the drilling fluid 23 received by the longitudinal fluid inlet 222 of inner pipe 220. Additionally, in this exemplary embodiment, the inner pipe 220 includes one or more finned inner baffles 228 extending helically through the central passage 227 of inner pipe 220. Inner baffles 228 enhance the turbulence of the flow of drilling fluid 23 and the mixing of the hot drilling fluid 23 received by the longitudinal fluid inlet 222 and the cooled drilling fluid 23 received by the radial fluid inlet 224 of inner pipe 220. In this exemplary embodiment, a control valve 230 located between the mud chilling system 125 and the pipe-in-pipe heat exchanger 202 controls the amount of cooled drilling fluid 23 diverted at the discharge of mud chilling system 125 to the radial fluid inlet 224 of inner pipe 220.

Drilling fluid pre-chilling system 200 does not require the separation of solids from drilling fluid 23 before the drilling fluid 23 is received by pipe-in-pipe heat exchanger 202. Instead, the relatively large inner diameter of the central passage 227 of pipe-in-pipe heat exchanger 202 ensures that solid particles having a relatively large size (e.g., 0.25 inches or greater) entrained within drilling fluid 23 do not foul or otherwise impede the operation or reduce the reliability of pipe-in-pipe heat exchanger 202. In this manner, drilling fluid pre-chilling system 200 may cool the drilling fluid 23 before it is received by solids control system 110, thereby protecting components of solids control system 110 from the heat of the drilling fluid 23 received at the longitudinal fluid inlet 222 of pipe-in-pipe heat exchanger 202.

Figure 5:
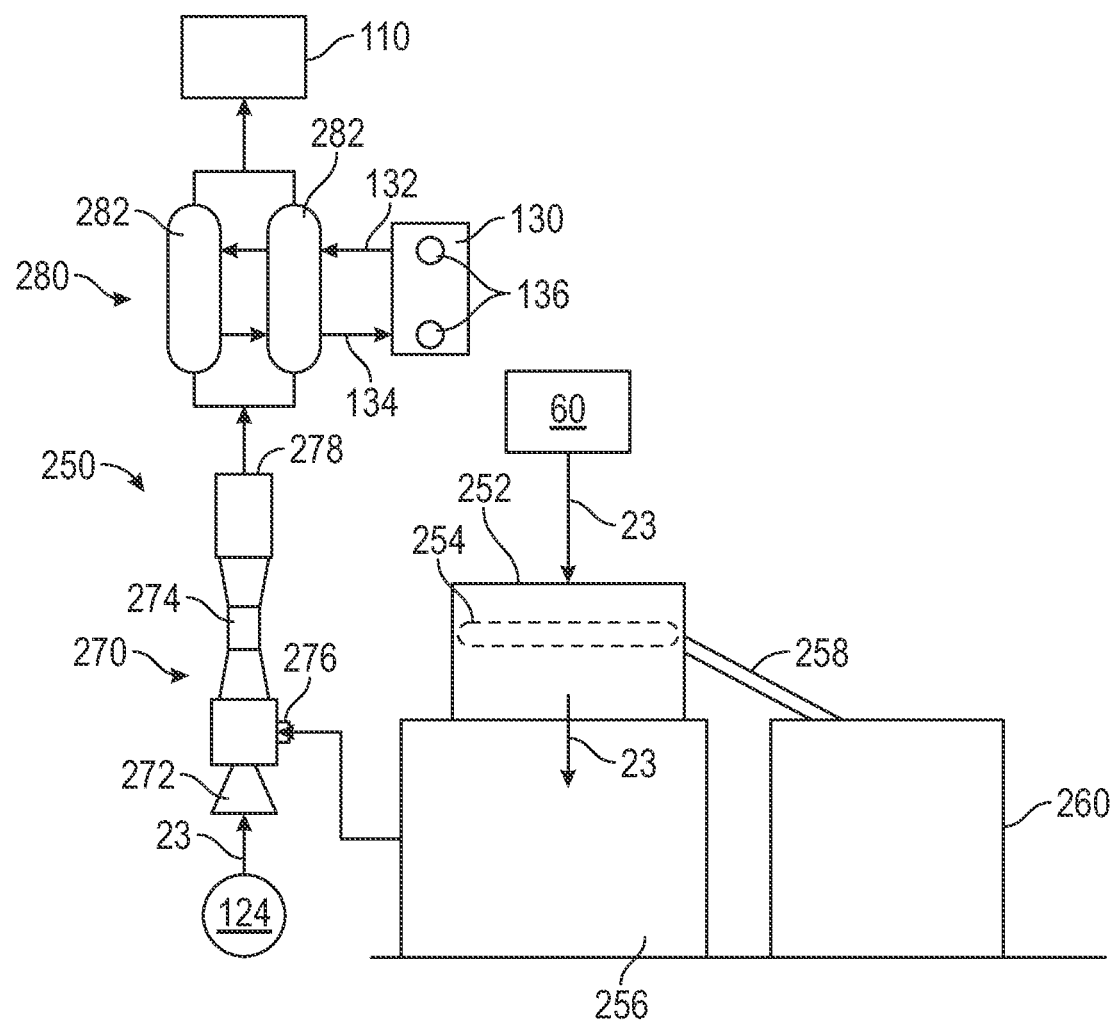
FIG. 5 is a schematic view of another embodiment of a drilling fluid pre-chilling system of the drilling fluid conditioning system of FIG. 2.

Referring now to FIG. 5, another embodiment of a drilling fluid pre-chilling system 250 of the drilling fluid conditioning system 100 shown in FIGS. 1, 2 is shown in FIG. 5. Drilling fluid pre-chilling system 250 is generally configured to cool hot drilling fluid 23 (e.g. at temperatures of or exceeding 250° F.) containing large solid particles (e.g., solids having a diameter of 0.25 inches or greater) to a temperature of at most 200° F.; however, the temperature of the drilling fluid 23 at the outlet of drilling fluid pre-chilling system 250 may vary based on the application, including the temperature of the drilling fluid 23 at the inlet of drilling fluid pre-chilling system 250. In this exemplary embodiment, drilling fluid pre-chilling system 250 generally includes a solids separator 252, a solids receptacle 260, a jet pump or eductor 270, and a cooler or heat exchanger system 280.

Solids separator 252 of drilling fluid pre-chilling system 250 is generally configured to remove solids from the drilling fluid 23 having a size which may foul or otherwise hinder the performance of heat exchanger system 280. For example, solids separator 252 may separate solid particles having a diameter of 0.50 inches or greater; however, in other embodiments, the size of the solid particles removed by solids separator 252 may vary. The solids separator 252 may not separate out as small or fine of solid particles as the solids control system 110, but the solids separator 252 may instead be configured to tolerate relatively higher temperatures (e.g., drilling fluid at or above 250° F.) than the solids control system 110. Additionally, while solids separator 252 is shown receiving drilling fluid 23 from MPD system 60, in other embodiments, the drilling fluid 23 received by solids separator 252 may not come from a pressurized source such as MPD system 60, and instead may be at atmospheric pressure.

In this exemplary embodiment, solids separator 252 comprises a "gumbo chain" separator including an open mesh conveyor belt 254 which captures solids having a minimum particle size while allowing the drilling fluid 23 to pass therethrough into a fluid outlet 256 of the solids separator 252. The solids captured by solids separator 252 are transported to a solids outlet 258 of solids separator 252 which communicate the captured solids to the solids receptacle or cuttings bin 260 for storage. The solids receptacle 260 may be periodically cleaned by an excavator or other mechanism. Additionally, given that solids separator 252 comprises an open mesh conveyor 254, the drilling fluid 23 collected at fluid outlet 256 is at atmospheric pressure.

Given that drilling fluid 23 collected at the fluid outlet 256 of solids separator 252 is at atmospheric pressure, the drilling fluid 23 must be pumped to the heat exchanger system 280. The jet pump 270 of drilling fluid pre-chilling system 250 serves to pump the drilling fluid 23 collected in the fluid outlet 256 of solids separator 252 to the heat exchanger system 280. However, jet pump 270 does not include an impeller or reciprocating piston for pumping the drilling fluid 23 which may be damaged by solids remaining within drilling fluid 23 after the drilling fluid 23 exits solids separator 252. Instead, jet pump 270 includes a first or motive inlet 272 which receives pressurized drilling fluid 23 from the discharge of a pump 124 of the suction tank 120. However, in other embodiments, the pump powering the flow of fluid through motive inlet 272 may be from any source downstream of the solids control system 110. The pressurized drilling fluid 23 enters the jet pump 270 at the motive inlet 272 thereof and flows through a throat 274 of the jet pump 270, thereby inducing suction at a second or suction inlet 276 of jet pump 270 connected to the fluid outlet 256 of solids separator 252. In this manner, drilling fluid 23 from the fluid outlet 256 of solids separator 252 is suctioned into the jet pump 270 via suction inlet 276, mixed with the pressurized drilling fluid 23 pumped from the pump 124, and ejected from a fluid outlet 278 of the jet pump 270 connected to the heat exchanger system 280. In the manner described above, jet pump 270 may pump drilling fluid 23 from the fluid outlet 256 of solids separator 252 to the heat exchanger system 280 without becoming clogged or fouled by any remaining solids entrained in drilling fluid 23.

Heat exchanger system 280 is generally configured to cool the drilling fluid 23 ejected by jet pump 270 to a safe temperature with respect to personnel of drilling fluid conditioning system 100 and/or to a temperature tolerable by the solids control system 110 whereby solids control system 110 will not become damaged when handling the drilling fluid 23. In this exemplary embodiment, heat exchanger system 280 comprises a plurality of heat exchangers positioned downstream from the fluid outlet 278 of jet pump 270 and upstream from the solids control system 110 of drilling fluid conditioning system 100. Heat exchangers 282 exchange heat between the drilling fluid 23 received from jet pump 270 and at least a portion of the chilled water 132 produced by water cooling system 130, the chilled water 132 serving as a heat sink in this embodiment. Heat transferred from the drilling fluid 23 may be returned to the water cooling system 130 via the heated water 134. In other embodiments, heat exchanger system 280 may transfer heat from the drilling fluid 23 to a heat sink such as, for example, the ambient air and/or to ambient water supplied by a local body of water or other heat sink. Heat exchangers 282 may comprise shell-and-tube heat exchangers or other types of heat exchangers known in the art. Additionally, heat exchangers 282 may each be configured to tolerate solid particles having a size less than the solid particles removed by solids separator 252. For example, heat exchangers 282 may tolerate solids having a diameter of less than 0.50 inches in embodiments where solids separator 252 is configured to separate out solid particles having a size of 0.50 inches or greater.

Figure 6:
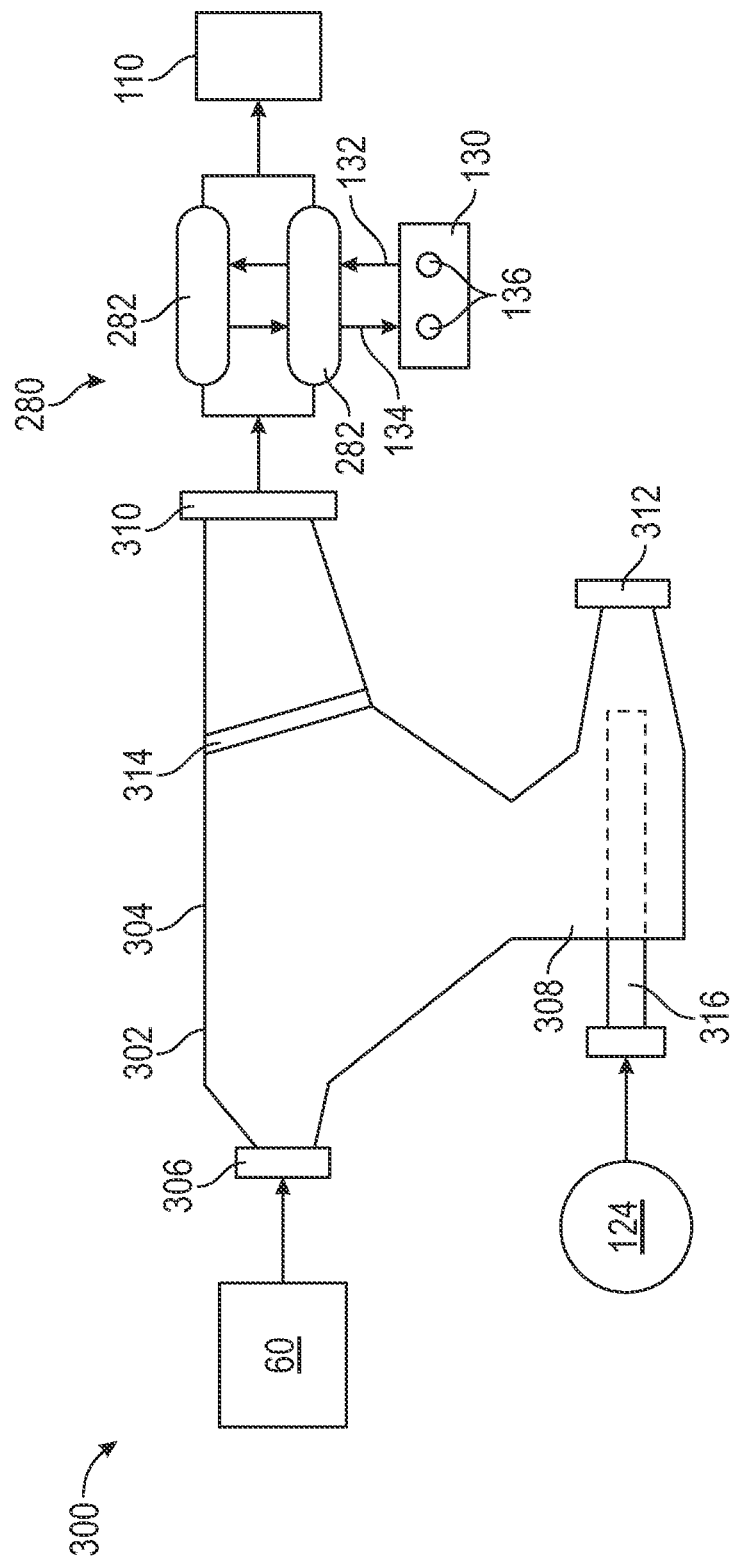
FIG. 6 is a schematic view of another embodiment of a drilling fluid pre-chilling system of the drilling fluid conditioning system of FIG. 2.

Referring now to FIG. 6, another embodiment of a drilling fluid pre-chilling system 300 of the drilling fluid conditioning system 100 shown in FIGS. 1, 2 is shown in FIG. 6. Drilling fluid pre-chilling system 300 is also generally configured to cool hot drilling fluid 23 (e.g. at temperatures of or exceeding 250° F.) containing large solid particles (e.g., solids having a diameter of 0.25 inches or greater) to a temperature of at most 200° F.; however, the temperature of the drilling fluid 23 at the outlet of drilling fluid pre-chilling system 300 may vary based on the application, including the temperature of the drilling fluid 23 at the inlet of drilling fluid pre-chilling system 300. Additionally, drilling fluid pre-chilling system 300 has features in common with drilling fluid pre-chilling system 250 shown in FIG. 5, and shared features are labeled similarly. Particularly, drilling fluid pre-chilling system 300 is similar to drilling fluid pre-chilling system 250 except that instead of including an open (exposed to the surrounding atmosphere) solids separator 252, drilling fluid pre-chilling system 300 includes an enclosed and pressure-containing solids separator or catcher 302. In this manner, drilling fluid pre-chilling system 300 may utilize the pressure applied to the drilling fluid 23 by MPD system 60 to pump or transport the drilling fluid 23 to the heat exchanger system 280 instead of requiring a separate pump (e.g., jet pump 270 of drilling fluid pre-chilling system 250). However, in other embodiments in which drilling system 10 does not include MPD system 60, solids catcher 302 may still be utilized in conjunction with a separate pump, such as a jet pump, for transporting the drilling fluid 23 from solids catcher 302 to the heat exchanger system 280.

In this exemplary embodiment, solids catcher 302 comprises an enclosed pressure vessel 304 including a drilling fluid inlet 306, a solids collector or bin 308, a drilling fluid outlet 310, and a solids outlet 312. Pressure vessel 304 may comprise a Y-strainer and thus may be referred to as such herein. A perforated plate or screen 314 is located between the drilling fluid inlet 306 and drilling fluid outlet 310 to prevent solids having a maximum size or diameter from exiting drilling fluid outlet 310 along with the drilling fluid 23. For example, solids catcher 302 may separate solid particles having a diameter of 0.50 inches or greater; however, in other embodiments, the size of the solid particles removed by solids catcher 302 may vary. Similar to the solids separator 252 of drilling fluid pre-chilling system 250, the solids catcher 302 of drilling fluid pre-chilling system 300 may not separate out as small or fine of solid particles as the solids control system 110, but the solids catcher 302 may instead be configured to tolerate relatively higher temperatures (e.g., drilling fluid at or above 250° F.) than the solids control system 110.

The solid particles captured by solids catcher 302 are collected within the solids collector 308 located at the bottom of pressure vessel 304. In this exemplary embodiment, solids catcher 302 comprises a jetting pump 316 which extends into the solids collector 308 and is configured to evacuate or clean the solids collector 308 of collected solids and to transport those ejected solids to the solids control system 110 for storage. Jetting pump 316 may be powered by pump 124 of suction tank 120 and/or any other source downstream from solids control system 110.

Figure 7:
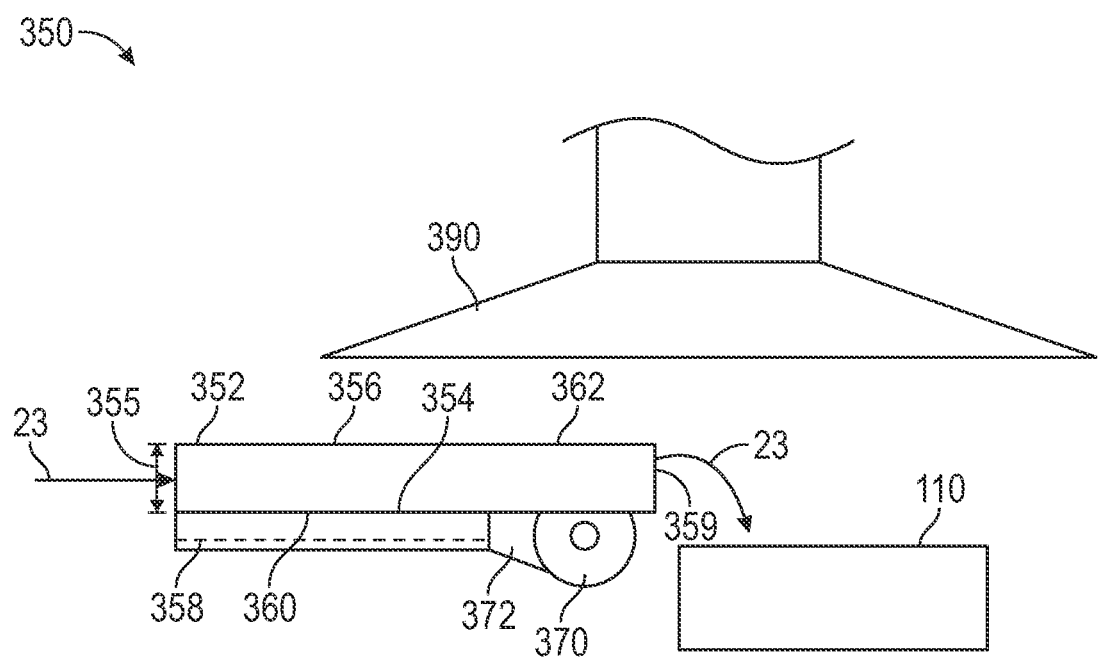
FIG. 7 is a schematic view of another embodiment of a drilling fluid pre-chilling system of the drilling fluid conditioning system of FIG. 2.
Figure 8:
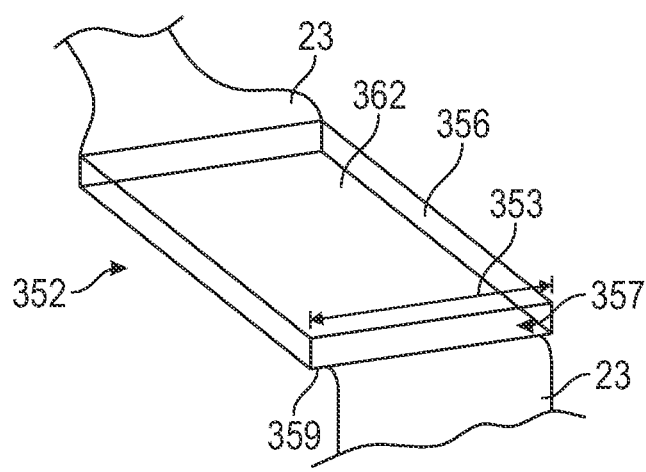
FIGS. 8, 9 are perspective views of an embodiment of a cooler of the drilling fluid pre-chilling system of FIG. 7.
Figure 9:
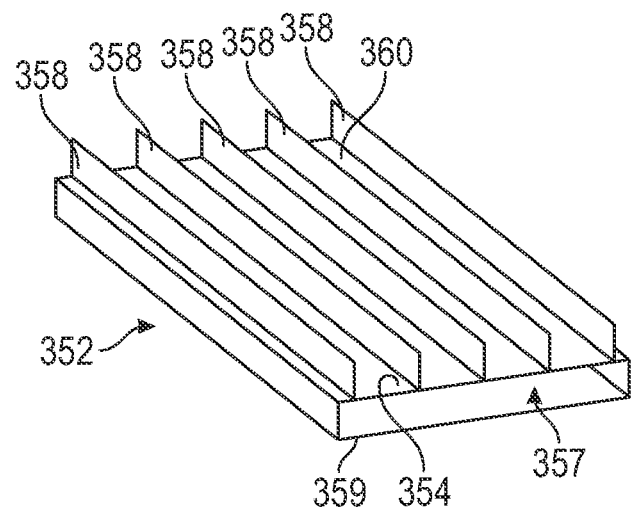

Referring now to FIGS. 7-9, another embodiment of a drilling fluid pre-chilling system 350 of the drilling fluid conditioning system 100 shown in FIGS. 1, 2 is shown in FIGS. 7-9. As with drilling fluid pre-chilling systems 200, 250, and 300 described above, drilling fluid pre-chilling system 350 is also generally configured to cool hot drilling fluid 23 (e.g. at temperatures of or exceeding 250° F.) containing large solid particles (e.g., solids having a diameter of 0.25 inches or greater) to a temperature of at most 200° F.; however, the temperature of the drilling fluid 23 at the outlet of drilling fluid pre-chilling system 350 may vary based on the application, including the temperature of the drilling fluid 23 at the inlet of drilling fluid pre-chilling system 350. In this exemplary embodiment, drilling fluid pre-chilling system 350 generally includes a cooler or heat exchanging pan or tray 352, an air circulator or blower 370, and a chimney hood 390.

Heat exchanging tray 352 of drilling fluid pre-chilling system 350 is generally configured to exchange heat between drilling fluid 23 received from MPD system 60 with the ambient air surrounding heat exchanging tray 352, where the ambient air serves as a heat sink. While in this exemplary embodiment heat exchanging tray 352 receives drilling fluid 23 from MPD system 60, in other embodiments, heat exchanging tray 352 may be gravity fed with the drilling fluid 23 received by tray 352 being at atmospheric pressure. Heat exchanging tray 352 forms a central passage 357 having a rectangular prismatic cross-section; however, in other embodiments the geometric configuration of heat exchanging tray 352 may vary. Additionally, heat exchanging tray 352 has a lateral width 353 (orthogonal the direction of flow of drilling fluid 23 through tray 352) that is greater than a vertical height 355 of the heat exchanging tray 352. In this manner the drilling fluid 23 may be conveyed through heat exchanging tray 352 as a relatively thin sheet of fluid. The relatively greater width 353 of heat exchanging tray 352 increases the surface area of the drilling fluid 23 which directly contacts the tray 352, maximizing the heat transfer from drilling fluid 23 to the heat exchanging tray 352.

Heat exchanging tray 352 comprises a planar floor 354 and a planar roof 356 opposite the floor 354. In this exemplary embodiment, an exterior surface 362 the roof 356 of heat exchanging tray 352 comprises a reflective material to assist in transferring heat from the drilling fluid 23. Additionally, in this exemplary embodiment, a plurality of longitudinally extending veins or fins 358 are positioned along an exterior surface 360 of the floor 354. Fins 358 are planar in shape in this embodiment but the configuration or shape of fins 358 may vary in other embodiments. Fins 358 are configured to conduct heat transferred from the drilling fluid 23 to the heat exchanging tray 352 away from the drilling fluid 23. Additionally, air blower 370 is positioned at a downstream end 359 of the heat exchanging tray 352 and is configured to blow or circulate ambient air across the fins 358 to transfer heat from the fins 358 to the ambient air circulated by air blower 370.

Figure 10:
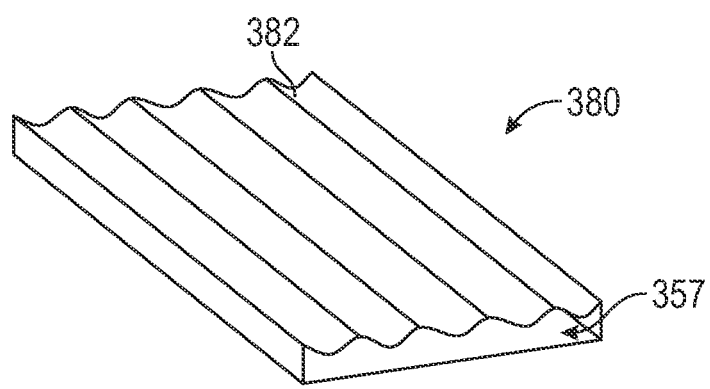
FIG. 10 is a perspective view of another embodiment of a cooler of the drilling fluid pre-chilling system of FIG. 7.

Although in this exemplary embodiment the floor 354 of heat exchanging tray 352 is planar, in other embodiments, the configuration of floor 354 may vary. Particularly, configurations other than fins 358 may be utilized to increase the surface area of floor 354 and thereby a rate of heat transfer from the drilling fluid 23 to the surrounding environment. For example, referring briefly to FIG. 10, another embodiment of a cooler or heat exchanging tray 380 is shown. Heat exchanging tray 380 may be incorporated into drilling fluid pre-chilling system 350 in lieu of, or in combination with, heat exchanging tray 352. Additionally, heat exchanging tray 380 is similar in configuration to heat exchanging tray 352 shown in FIGS. 7-9 except that heat exchanging tray 380 comprises a corrugated floor 382 configured to increase surface contact and retention time of the drilling fluid 23 with the corrugated floor 382, thereby maximizing heat transfer from the drilling fluid 23 to the heat exchanging tray 380.

The trough and crest arrangement of the corrugated floor 382 of heat exchanging tray 380 may be orientated in such fashion that the corrugations may be arranged in parallel with the flow of drilling fluid 23. However, in other embodiments, the corrugations of corrugated floor 382 may be arranged perpendicular to the flow of drilling fluid 23. In still other embodiments, the tough/crest arrangement of corrugated floor 382 may be in chevron pattern, or combination of chevron, parallel or perpendicular to drilling fluid 23 flow direction. When arranged in a chevron pattern, the orientation of the vertices for the chevron pattern may be toward the downstream end 359 of the heat exchanging tray 380.

Referring again to FIGS. 7-9, in this exemplary embodiment, ductwork 372 extends from an outlet or discharge of air blower 370 and enshrouds the fins 358 such that the air blown by air blower 370 is forced to flow along the fins 358 to thereby maximize heat transfer between the fins 358 and the circulated air. Further, given that air blower 370 is located at the downstream end 359 of heat exchanging tray 352, air blower 370 is configured to circulate air in a reverse direction with respect to the direction of flow of the drilling fluid 23 circulating through heat exchanging tray 352. However, in other embodiments, air blower 370 may be positioned to a lateral side of heat exchanging tray 352 or at an upstream end of heat exchanging tray 352. In other embodiments, drilling fluid pre-chilling system 350 may not include ductwork 372 routing the air circulated by air blower 370 along fins 358. In still other embodiments, the discharge of air blower 370 may be directed into the central passage 357 of heat exchanging tray 352.

Upon reaching the downstream end 359 of heat exchanging tray 352, the drilling fluid 23 is permitted to fall or cascade by gravity into the solids control system 110 of drilling fluid conditioning system 100. The relatively large opening provided by the central passage 357 of heat exchanging tray 352 eliminates the need to separate any solids from drilling fluid 23 upstream from the solids control system 110. Additionally, the drilling fluid pre-chilling system 350 may transfer sufficient heat from the drilling fluid 23 to the surrounding ambient air so that the drilling fluid 23 may not pose a hazard to personnel of drilling system 10 and/or may not damage or otherwise impede the operation of solids control system 110 and/or other components of drilling fluid conditioning system 100 located upstream from the mud chilling system 125. In this exemplary embodiment, chimney hood 390 is positioned above the downstream end 359 of heat exchanging tray 352 whereby fumes or vapors released from the exposed flow of drilling fluid 23 may be safely captured and thereby not exposed to personnel of drilling system 10. However, in other embodiments, drilling fluid pre-chilling system 350 may not include chimney hood 390.

Figure 11:
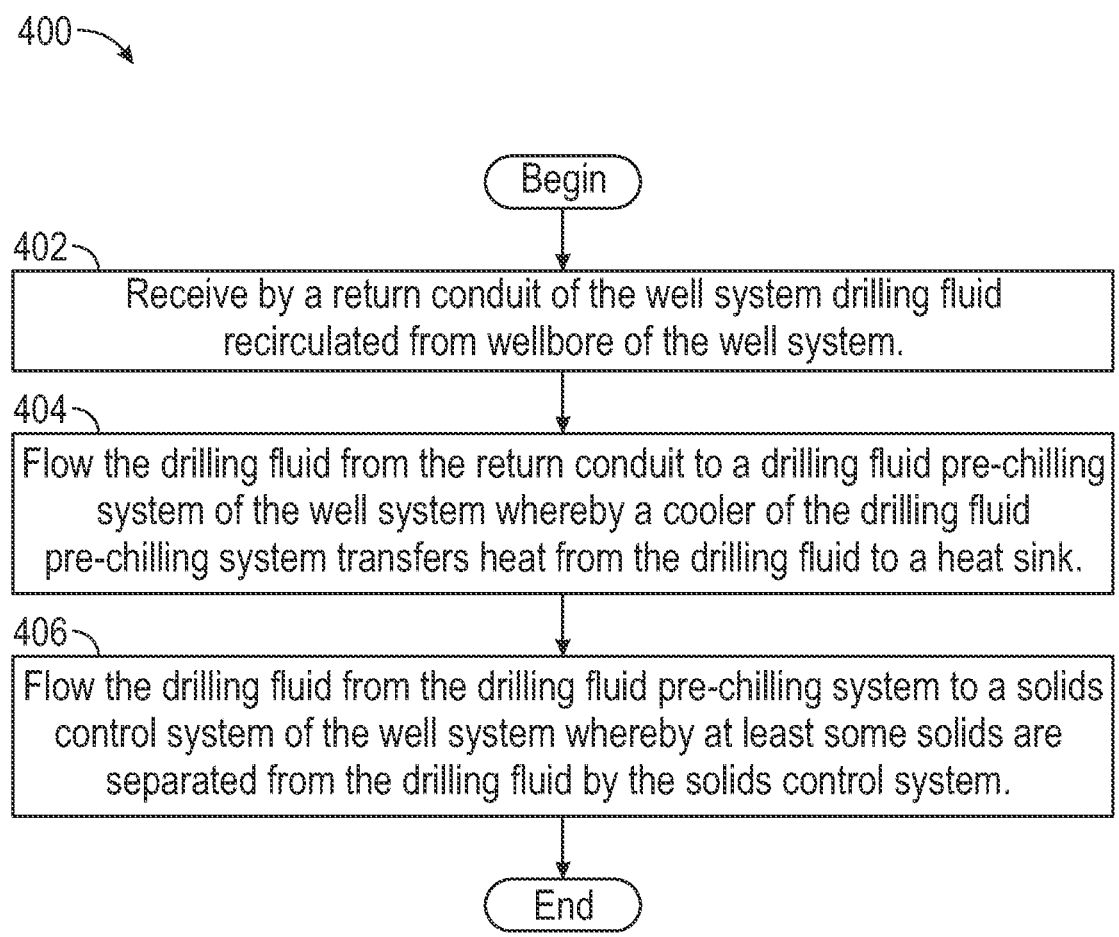
FIG. 11 is a flowchart of an embodiment of a method for conditioning a drilling fluid of a well system.

Referring to FIG. 11, an embodiment of a method 400 for conditioning drilling fluid of a well system is shown. At block 402, method 400 comprises receiving by a return conduit of the well system drilling fluid recirculated from a wellbore of the well system. In some embodiments, block 402 comprises receiving by the return conduit 102 of drilling system 10 the drilling fluid 23 recirculated from the wellbore 16 of drilling system 10 shown in FIG. 1. At block 404, method 400 comprises flowing the drilling fluid from the return conduit to a drilling fluid pre-chilling system of the well system whereby a cooler of the drilling fluid pre-chilling system transfers heat from the drilling fluid to a heat sink. In some embodiments, block 404 comprises flowing the drilling fluid 23 from the return conduit 102 to the drilling fluid pre-chilling system 105 shown in FIG. 2 to transfer heat from the drilling fluid 23 to at least one of ambient air and a water source. For example, block 404 may comprise flowing the drilling fluid 23 to one of the drilling fluid pre-chilling systems 200, 250, 300, and 350 shown in FIGS. 3-9, respectively.

At block 406, method 400 comprises flowing the drilling fluid from the drilling fluid pre-chilling system to a solids control system of the well system whereby at least some solids are separated from the drilling fluid by the solids control system. In some embodiments, block 406 comprises flowing the drilling fluid 23 from the drilling fluid pre-chilling system 105 to the solids control system 110 shown in FIG. 2 whereby at least some of the solids entrained in the drilling fluid are separated by the solids control system 110.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A drilling fluid conditioning system for a well system, the system comprising:
   a return conduit configured to receive drilling fluid recirculated from a wellbore of the well system;
   a drilling fluid pre-chilling system in fluid communication with and downstream from the return conduit, wherein the drilling fluid pre-chilling system comprises a cooler configured to transfer heat from the drilling fluid to a heat sink; and
   a solids control system in fluid communication with and downstream from the drilling fluid pre-chilling system, wherein the solids control system is configured to separate at least some solids from the drilling fluid;
   wherein the cooler of the drilling fluid pre-chilling system comprises a pipe-in-pipe heat exchanger which comprises an inner pipe comprising a first fluid inlet configured to receive the drilling fluid and an outer pipe surrounding the inner pipe and configured to receive water from a water source, and wherein at least one of a finned outer baffle extends helically through an annulus formed between the inner pipe and the outer pipe, and a finned inner baffle extends helically through a central passage of the inner pipe.

2. The system of claim 1, further comprising:
   a drilling fluid chiller in fluid communication with and downstream from the solids control system, wherein the drilling fluid chiller is configured to further cool the drilling fluid;
   wherein the inner pipe of the pipe-in-pipe heat exchanger comprises a second fluid inlet configured to receive the drilling fluid cooled by the drilling fluid chiller.

3. The system of claim 1, wherein the drilling fluid pre-chilling system comprises a solids separator in fluid communication with and upstream from the cooler, wherein the solids separator is configured to remove solids from the drilling fluid received by the drilling fluid pre-chilling system having a minimum size of 0.25 inches or greater.

4. The system of claim 3, wherein the solids separator comprises an open air, mesh conveyor belt configured to convey solids captured by the solids separator to a solids receptacle.

5. The system of claim 4, further comprising a jet pump configured to transport the drilling fluid from the solids separator to the cooler.

6. The system of claim 3, wherein the solids separator comprises a Y-strainer comprising a screen configured to block the passage of the solids having a minimum size of 0.25 inches or greater.

7. The system of claim 1, wherein the cooler of the drilling fluid pre-chilling system comprises a heat exchanging tray having a lateral width that is greater than a vertical height of the heat exchanging tray.

8. The system of claim 7, wherein the cooler comprises an air blower configured to circulate air along a plurality of fins extending from the heat exchanging tray.

9. The system of claim 1, wherein the cooler is configured to cool the drilling fluid to a temperature of at most 200 degrees Fahrenheit.

10. The system of claim 1, wherein the drilling fluid received by the drilling fluid pre-chilling system comprises solids having a maximum diameter of 0.25 inches and greater.

11. A drilling fluid conditioning system for a well system, the system comprising:
- a return conduit configured to receive drilling fluid recirculated from a wellbore of the well system; and
- a drilling fluid pre-chilling system in fluid communication with and downstream from the return conduit, wherein the drilling fluid pre-chilling system comprises:
  - a cooler configured to transfer heat from the drilling fluid to a heat sink, the drilling fluid comprising solids having a maximum diameter of 0.25 inches and greater, and
  - a solids separator in fluid communication with and upstream from the cooler, wherein the solids separator is configured to remove solids from the drilling fluid received by the drilling fluid pre-chilling system having a minimum size of 0.25 inches or greater.

12. The system of claim 11, wherein the cooler of the drilling fluid pre-chilling system comprises a pipe-in-pipe heat exchanger which comprises an inner pipe comprising a first fluid inlet configured to receive the drilling fluid and an outer pipe surrounding the inner pipe and configured to receive water from a water source.

13. The system of claim 12, further comprising:
- a drilling fluid chiller in fluid communication with and downstream from the drilling fluid pre-chilling system, wherein the drilling fluid chiller is configured to further cool the drilling fluid;
- wherein the inner pipe of the pipe-in-pipe heat exchanger comprises a second fluid inlet configured to receive the drilling fluid cooled by the drilling fluid chiller.

14. The system of claim 11, wherein the solids separator comprises an open air, mesh conveyor belt configured to convey solids captured by the solids separator to a solids receptacle.

15. The system of claim 11, wherein the cooler of the drilling fluid pre-chilling system comprises a heat exchanging tray having a lateral width that is greater than a vertical height of the heat exchanging tray.

16. The system of claim 11, wherein the cooler is configured to cool the drilling fluid to a temperature of at most 200 degrees Fahrenheit.

17. The system of claim 11, further comprising a solids control system in fluid communication with and downstream from the drilling fluid pre-chilling system, wherein the solids control system is configured to separate at least some solids from the drilling fluid.

18. A drilling fluid conditioning system for a well system, the system comprising:
- a return conduit configured to receive drilling fluid recirculated from a wellbore of the well system;
- a drilling fluid pre-chilling system in fluid communication with and downstream from the return conduit, wherein the drilling fluid pre-chilling system comprises:
  - a cooler configured to transfer heat from the drilling fluid to a heat sink;
  - a solids separator in fluid communication with and upstream from the cooler, wherein the solids separator is configured to remove solids from the drilling fluid received by the drilling fluid pre-chilling system having a size equal to or greater than a predefined minimum size;
  - a jet pump configured to transport the drilling fluid from the solids separator to the cooler; and
  - a solids control system in fluid communication with and downstream from the drilling fluid pre-chilling system, wherein the solids control system is configured to separate at least some solids from the drilling fluid.

19. The system of claim 18, wherein the predefined minimum size is equal to 0.25 inches.

20. The system of claim 18, further comprising a solids control system in fluid communication with and downstream from the drilling fluid pre-chilling system, wherein the solids control system is configured to separate at least some solids from the drilling fluid.

21. The system of claim 20, further comprising a drilling fluid chiller in fluid communication with and downstream from the solids control system, wherein the drilling fluid chiller is configured to further cool the drilling fluid.

22. The system of claim 21, wherein the jet pump of the drilling fluid pre-chilling system comprises a motive inlet configured to receive a flow of the drilling fluid from the drilling fluid chiller.

23. The system of claim 22, wherein the jet pump of the drilling fluid pre-chilling system comprises a suction inlet configured to receive the drilling fluid from the solids separator.

* * * * *